United States Patent [19]

Kato et al.

[11] 3,912,591

[45] Oct. 14, 1975

[54] PROCESS FOR THE PRODUCTION OF PULLULAN

[75] Inventors: Koso Kato; Makoto Shiosaka, both of Okayama, Japan

[73] Assignee: Hayashibara Biochemical Laboratories, Incorporated, Okayama, Japan

[22] Filed: Aug. 29, 1973

[21] Appl. No.: 392,621

[30] Foreign Application Priority Data

Sept. 4, 1972 Japan................................ 47-87938

[52] U.S. Cl.................. 195/31 P; 195/81; 195/100
[51] Int. Cl.².......................................... C12D 13/04
[58] Field of Search......... 195/31 P, 82, 94, 81, 100; 260/209 R

[56] References Cited
UNITED STATES PATENTS
3,320,136  5/1967  Zajic..................................... 195/82

OTHER PUBLICATIONS

Catley, Applied Microbiology, Vol. 22, No. 4, pp. 650–654, (Oct. 1971).

Catley, Applied Microbiology, Vol. 22, No. 4, pp. 641–649, (Oct. 1971).

Veda et al., Applied Microbiology, Vol. 11, pp. 211–215, (1963).

Primary Examiner—Lionel M. Shapiro
Assistant Examiner—Thomas G. Wiseman
Attorney, Agent, or Firm—Hans Berman; Kurt Kelman

[57] ABSTRACT

In the production of pullulan by aerobic, microbial fermentation of saccharides, the degree of polymerization, the yield and the culture period are controlled by adjusting the pH value and the concentration of phosphate ion in the culture medium.

6 Claims, No Drawings

PROCESS FOR THE PRODUCTION OF PULLULAN

The present invention relates to a process for the production of pullulan by microorganisms in a culture medium containing a saccharide as a principal carbon source.

Pullulan is a polymer of glucose, more particularly, a polysaccharide consisting of alpha-1,4-linked maltotriose units which are connected by alpha-1,6-linkages between the terminal glucosidic residues of the trisaccharide.

As disclosed by H. Bender, Biochem. Biophys. Acta, 36, 309 (1959), Seinosuke Ueda, Journal of the Chemical Society of Japan, Industrial Chemistry Section, 67, 575–760 (1964) and Eiji Ninomiya, Journal of Agricultural Chemical Society of Japan, 43, 115–118 (1969), pullulan is obtained from a strain of *Pullularia pullulans* extracellularly when said strain is cultured aerobically in a medium containing sucrose and/or glucose as carbon sources. The degrees of polymerization (hereinafter abbreviated as DP) of the thus obtained pullulan are reported as falling in the range of a few hundreds to a several thousands. However, there is no known relationship between the culture condition and the degree of polymerization of pullulan.

It has now been found that lowering of the initial pH of the culture medium and/or decreasing the concentration of phosphate ion present in the medium greatly increases the DP of pullulan. Raising the initial pH value shortens the culture period and increases the yield of pullulan, i.e. the ratio of pullulan to available sugar. These findings made practical the free adjustments of DP, yield and culture period of pullulan in its commercial production and the economical production of pullulan with the desired DP.

The present invention provides also a process wherein the culture period can be shortened and the yield of pullulan is improved by culturing in a culture medium with a higher pH and a higher phosphate concentration. This process is suitable for producing pullulan of low molecular weight which is readily purified and may be converted to products of low viscosity or to maltotriose. In the production of shaped articles, such as films, sheets and fibers, pullulan of higher molecular weight is desired, and lowering the initial pH and phosphate content of the culture medium can result in the production of pullulan with a molecular weight of more than two millions.

The pullulan producing microorganisms employable in the present invention include *Pullularia fermentans var fermentans* IFO 6401, *Pullularia fermentans var fusca* IFO 6402, *Pullularia pullulans* AHU 9553, *Pullularia pullulans* IFO 6353, and *Dematium pullulans* IFO 4464.

Suitable known carbon sources include invert sugar, isomerized sugar, fructose, and glucose, but partly hydrolyzed starch gives very satisfactory results.

Generally, ammonium salts, nitrates, and peptone may be used as nitrogen sources. Appropriate amounts of phosphate and metal ions, such as magnesium and ferrous ions, may be added to the culture medium. After heat sterilizing of the culture medium and pH adjustment, the microorganism is cultured in the medium with aeration or agitation, at 25°–30°C, preferably at 27°C, for about 7 days. About 3 days after the start of the fermentation, accumulation of a considerable amount of pullulan is observed, and the viscosity of the culture mixture increases.

The residual sugar in the medium is determined at certain intervals, and cultivation is discontinued when the amount of residual sugar approaches a minimum. The microbial cells are removed from the liquid medium by centrifuging, and the cellfree liquid medium is decolorized with active carbon, if desired.

Preferably, the liquor is mixed with a hydrophilic organic solvent, such as methanol or ethanol, to precipitate the accumulated pullulan which is recovered by centrifuging. If desired, the recovered pullulan is dissolved in warm water and again precipitated by solvent. The pullulan obtained after drying is a whitish powder which very readily dissolves in water to form a viscous solution. The molecular weight of the pullulan obtained varies depending on the culture conditions between 50,000 and 4,500,000. The yield of pullulan based on the sugar employed as a carbon source also varies from 20 to 75% depending on the culture conditions.

The present invention relates to the effects of pH and phosphate ion concentration in the culture medium on the molecular weight and yield of pullulan and on the culture period.

An initial pH of 6.5 or less increases the viscosity of the culture broth to over 300 centipoises, and an initial pH of 7.0 or higher decreases the viscosity to less than 240 centipoises. When the pH was 5 to 6, the pullulan obtained had a molecular weight from 1,500,000 to 4,000,000 and the culture broth lost its fluidity. When the incubation was carried out at pH 6.5 or higher, the yield of pullulan was in the range of 50 to 75%. The molecular weight measured by gel filtration analysis was about 50,000 to 100,000. The present invention provides higher yields compared with those of the processes heretofore disclosed, which ranged from about 20 to about 50%. At a pH of 5.5, the viscosity of the broth was over 1000 centipoises, whereas at pH 7.0–8.0 the viscosity was merely 24–31 centipoises. However, a pH of 7.0–8.0 results in a yield above 50%, while the yield of pullulan based on the initial sugar was 30% at pH 5.5.

The mean molecular weight of the pullulan was about 3,000,000 at pH 6 of the culture medium, whereas it was about 80,000 at pH 7.0.

The residual sugar after eight days of cultivation was about 10 to 20%. However, at pH 7–8, the residual sugar dropped within 4 to 6 days to 1 to 10%, and the pullulan yield reached its maximum in the same period. The higher the pH value of the culture medium, the quicker the consumption of sugar and the formation of pullulan, and the higher the yield of pullulan.

The improvement brought about by controlling the pH of the culture medium is most significant when an extract of dates is used as the carbon source.

Dates have a sugar content of about 50%. The solids in an aqueous extract of dates consist mostly of approximately equivalent amounts of glucose and fructose, the remainder being inorganic salts. Date extract, when used as a carbon source after decolorization with active carbon or untreated, shortens the culture period and improves the pullulan yield, as does high pH. However, a date extract purified with ion exchangers is not significantly different from starch hydrolyzate or sucrose as carbon source. This is probably due to the buffer action of the ions which are present in a large amount in the extract and prevent a decrease of the pH value during culturing.

It has further been found that the concentration of phosphate ion in the medium affects the culture period and the yield of pullulan. For example, 0.1–0.5 g/dl phosphate at pH 5.5 results in the production of pullulan having a molecular weight from 1,500,000 to 3,000,000, and the molecular weight of the pullulan decreases with increasing phosphate concentration. 0.1–0.3 g/dl Phosphate produces pullulan with a molecular weight of 2,000,000–3,000,000. Similarly, at pH 6.0, 0.5 g/dl phosphate gives a molecular weight of about 70,000, whereas 0.1–0.2 g/dl gives about 200,000. As described above, a low initial pH value gives generally pullulan of high molecular weight which, however, varies greatly with phosphate concentration. Thus, the molecular weight of the pullulan produced in the culture medium can be controlled by varying the initial pH value and/or the phosphate ion concentration in the medium. A phosphate such as $K_2HPO_4$ is used conventionally in the fermentation.

ulating it with 2% by volume of a starter culture of one of the strains, and then incubating the mixture at 27°C for 7 days on a rotary agitator.

Upon completion of the culture, the cells were removed by centrifuging. The supernatant was decolorized and purified with active carbon, and mixed with an equal volume of methanol to precipitate the pullulan. The precipitate recovered from the solution by centrifuging was redissolved in a small amount of water and again precipitated with methanol and recovered by centrifuging. The purified pullulan was washed with methanol and dried in a vacuum.

The results are listed in Tables 1-a and -b. Absorbance of a specimen, diluted ten times, was measured at 660 m$\mu$ in a model 101 Hitachi spectrophotomer using a 10 mm cell. Residual sugar values and pullulan yield in all Examples are based on the amount of sugar initially present.

Table 1-a.

Strain: Dematium pullulans IFO 4464

| Culture period, days | Final pH | | | Absorbance | | | Residual Sugar % | | | Pullulan Yield % | | | Mean Molecular weight |
|---|---|---|---|---|---|---|---|---|---|---|---|---|---|
| Initial pH | 4 | 6 | 7 | 4 | 6 | 7 | 4 | 6 | 7 | 4 | 6 | 7 | |
| 5.5 | 3.30 | 3.30 | 3.30 | 0.9 | 1.4 | 1.8 | 50.5 | 24.4 | 16.5 | 18.6 | 21.8 | 31.2 | $200\times10^4$ |
| 5.5 | 3.30 | 3.38 | 3.32 | 0.9 | 1.3 | 1.6 | 51.9 | 23.9 | 17.3 | 11.9 | 22.6 | 25.7 | $180\times10^4$ |
| 6.0 | 3.5 | 3.5 | 3.5 | 0.9 | 1.4 | 1.9 | 38 | 25 | 20 | 26 | 30 | 36 | $180\times10^4$ |
| 6.0 | 3.4 | 3.5 | 3.4 | 1.0 | 1.5 | 1.8 | 41 | 28 | 22 | 24 | 31 | 35 | $190\times10^4$ |
| 6.5 | 3.7 | 3.6 | 3.6 | 1.1 | 1.5 | 1.7 | 28 | 17 | 17 | 35 | 40 | 40 | $200\times10^4$ |
| 6.5 | 3.7 | 3.6 | 3.7 | 1.0 | 1.7 | 1.7 | 29 | 19 | 18 | 36 | 40 | 41 | $200\times10^4$ |
| 7.0 | 3.9 | 3.9 | 3.8 | 1.1 | 1.8 | 2.0 | 19 | 15 | 10 | 48 | 61 | 60 | $25\times10^4$ |
| 7.0 | 3.9 | 3.9 | 3.8 | 1.1 | 1.7 | 1.9 | 20 | 13 | 12 | 45 | 62 | 63 | $26\times10^4$ |
| 7.5 | 4.2 | 4.2 | 4.2 | 1.1 | 1.9 | 2< | 18 | 10 | 5 | 47 | 68 | 69 | $20\times10^4$ |
| 7.5 | 4.2 | 4.2 | 4.3 | 1.2 | 1.8 | 2< | 19 | 11 | 10 | 49 | 69 | 69 | $21\times10^4$ |
| 8.0 | 4.7 | 4.5 | 4.6 | 1.2 | 1.8 | 2< | 15 | 1 | 0.8 | 48 | 70 | 71 | $18\times10^4$ |
| 8.0 | 4.7 | 4.5 | 4.7 | 1.1 | 1.7 | 2< | 16 | 0.3 | 0.5 | 55 | 71 | 71 | $15\times10^4$ |

Table 1-b.

Strain Kp-13

| Culture period, days | Final pH | | | Turbidity | | | Residual Sugar % | | | Pullulan Yield, % | | | Mean Molecular Weight |
|---|---|---|---|---|---|---|---|---|---|---|---|---|---|
| Initial pH | 4 | 6 | 8 | 4 | 6 | 8 | 4 | 6 | 8 | 4 | 6 | 8 | |
| 5.5 | 3.3 | 3.3 | 3.2 | 0.9 | 1.3 | 1.8 | 50 | 18 | 12 | 17 | 27 | 38 | $246\times10^4$ |
| 6.0 | 3.4 | 3.4 | 3.3 | 1.1 | 1.5 | 1.8 | 28 | 17 | 10 | 31 | 40 | 55 | $292\times10^4$ |
| 6.5 | 3.6 | 3.6 | 3.5 | 1.2 | 2< | 2< | 16 | 10 | 1 | 35 | 68 | 70 | $20\times10^4$ |
| 7.0 | 4.0 | 3.9 | 3.9 | 1.3 | 2< | 2< | 15 | 5 | 0.5 | 31 | 69 | 75 | $8\times10^4$ |

The invention will be more fully illustrated in the examples which follow. In these examples, $K_2HPO_4$ is the phosphate.

EXAMPLE 1

The strains used were *Dematium pullulans* IFO 4464 and *Pullularia pullulans*-2 (hereinafter referred to as Kp-13). The culture medium contained 10 g/dl d.s.b. starch syrup with a dextrose equivalent (hereinafter abbreviated DE) of 43, 0.2 g/dl phosphate, 0.2 g/dl sodium chloride, 0.2 g/dl peptone, 0.04 g/dl magnesium sulfate and 0.001 g/dl ferrous ammonium sulfate. The starter or seed culture was obtained by culturing each strain on a medium of the above composition at 27°C for 2 days.

The main propagation was carried out by sterilizing 100 ml of the above medium in a 500 ml Ehrenmeyer flask, adjusting the pH of the medium to 5.5–8.0, inoc- Although the results obtained with Kp-13 do not always agree in every respect with those obtained with *Dematium pullulans* IFO 4464, both strains show a similar response to pH, a value of 7.0 or over giving a low molecular weight, whereas a pH of 6.0 or lower greatly increases the molecular weight of pullulan. The molecular weight of the pullulan differs slightly with the strain used. With both strains, a pH value of 6.5 or higher reduces the culture period and improves the yield of pullulan.

EXAMPLE 2

The procedure of Example 1 was followed using strain Kp-13 and sucrose as a carbon source with varying values of pH and varying phosphate concentrations. The results are listed in Table 2.

Table 2

| Phosphate % | Initial pH | Yield Culture period days 4 | 7 | Mean Molecular weight |
| --- | --- | --- | --- | --- |
| 0.1 | 5.5 | 21 | 27 | $250 \times 10^4$ |
| 0.2 | 5.5 | 35 | 40 | $250 \times 10^4$ |
| 0.3 | 5.5 | 35 | 42 | $280 \times 10^4$ |
| 0.4 | 5.5 | 36 | 43 | $260 \times 10^4$ |
| 0.5 | 5.5 | 37 | 46 | $150 \times 10^4$ |
| 0.1 | 6.0 | 20 | 25 | $200 \times 10^4$ |
| 0.2 | 6.0 | 37 | 50 | $300 \times 10^4$ |
| 0.3 | 6.0 | 37 | 55 | $200 \times 10^4$ |
| 0.4 | 6.0 | 40 | 61 | $80 \times 10^4$ |
| 0.5 | 6.0 | 41 | 67 | $30 \times 10^4$ |
| 0.1 | 6.5 | 20 | 26 | $20 \times 10^4$ |
| 0.2 | 6.5 | 31 | 39 | $15 \times 10^4$ |
| 0.3 | 6.5 | 57 | 65 | $8 \times 10^4$ |
| 0.4 | 6.5 | 68 | 70 | $7 \times 10^4$ |
| 0.5 | 6.5 | 70 | 72 | $7 \times 10^4$ |

EXAMPLE 3

The prodedure of Example 1 was followed with *Pullaria pullulans* IFO 6353, and glucose as a carbon source and varying values of pH and phosphate concentration. The results are listed in Table 3.

Table 3

| Phosphate % | Initial pH | Yield, % Culture period 4 days | 7 days | Mean Molecular Weight |
| --- | --- | --- | --- | --- |
| 0.1 | 5.5 | 18 | 25 | $270 \times 10^4$ |
| 0.2 | 5.5 | 21 | 32 | $270 \times 10^4$ |
| 0.3 | 5.5 | 31 | 38 | $280 \times 10^4$ |
| 0.4 | 5.5 | 34 | 40 | $200 \times 10^4$ |
| 0.5 | 5.5 | 35 | 40 | $110 \times 10^4$ |
| 0.1 | 6.0 | 20 | 28 | $180 \times 10^4$ |
| 0.2 | 6.0 | 38 | 49 | $200 \times 10^4$ |
| 0.3 | 6.0 | 41 | 57 | $200 \times 10^4$ |
| 0.4 | 6.0 | 43 | 63 | $50 \times 10^4$ |
| 0.5 | 6.0 | 45 | 65 | $20 \times 10^4$ |
| 0.1 | 6.5 | 25 | 28 | $25 \times 10^4$ |
| 0.2 | 6.5 | 34 | 37 | $15 \times 10^4$ |
| 0.3 | 6.5 | 61 | 68 | $8 \times 10^4$ |
| 0.4 | 6.5 | 65 | 68 | $5 \times 10^4$ |
| 0.5 | 6.5 | 67 | 70 | $5 \times 10^4$ |

As is apparent from Table 3, in a culture medium containing glucose, phosphate concentration and initial pH value affect the yield and molecular weight of pullulan as in the preceding experiments.

EXAMPLE 4

The effects of varying pH value and phosphate concentration on the molecular weight of the pullulan formed was tested with strains and under conditions which were the same as in Example 1. The variation of mean molecular weight due to varying pH value and phosphate concentration is listed in Tables 4 and 5. The culture period was seven days.

Table 4.

Strain: Kp-13

| Phosphate % | Initial pH | Yield, % | Mean Molecular Weight |
| --- | --- | --- | --- |
| 0.1 | 5.5 | 25 | $200 \times 10^4$ |
| 0.2 | 5.5 | 38 | $250 \times 10^4$ |
| 0.3 | 5.5 | 38 | $300 \times 10^4$ |
| 0.4 | 5.5 | 40 | $260 \times 10^4$ |
| 0.5 | 5.5 | 47 | $150 \times 10^4$ |
| 0.1 | 6.0 | 23 | $200 \times 10^4$ |
| 0.2 | 6.0 | 55 | $300 \times 10^4$ |
| 0.3 | 6.0 | 59 | $150 \times 10^4$ |
| 0.4 | 6.0 | 65 | $70 \times 10^4$ |
| 0.5 | 6.0 | 70 | $20 \times 10^4$ |
| 0.1 | 6.5 | 25 | $20 \times 10^4$ |
| 0.2 | 6.5 | 40 | $20 \times 10^4$ |
| 0.3 | 6.5 | 70 | $6.5 \times 10^4$ |
| 0.4 | 6.5 | 72 | $7.0 \times 10^4$ |
| 0.5 | 6.5 | 73 | $7.0 \times 10^4$ |

Table 5.

Strain: Dematium pullulans IFO 4464

| Phosphate % | Initial pH | Yield % | Mean Molecular Weight |
| --- | --- | --- | --- |
| 0.1 | 6.5 | 40 | $200 \times 10^4$ |
| 0.2 | 6.5 | 60 | $200 \times 10^4$ |
| 0.3 | 6.5 | 70 | $290 \times 10^4$ |
| 0.4 | 6.5 | 70 | $350 \times 10^4$ |
| 0.5 | 6.5 | 71 | $62 \times 10^4$ |

As is apparent from the above results, it is preferable to use 0.2–0.4% phosphate in the culture medium to obtain pullulan of high molecular weight.

EXAMPLE 5

The procedure of Example 1 was used except for date extract being the carbon source. The date extract was prepared by immersing dates in four volumes of warm water with occasional agitation for three hours and then recovering the supernatant which was subsequently decolorized with active carbon and concentrated. The solid content of the resulting solution was 18 g/dl of which about 50% was glucose, the rest being mostly fructose and a small amount of pentose. The extract was dark in color and its total anion content, as $CaCO_3$, was 2500–3500 mg per liter, and the ash content of the original extract based on sugar weight was around 2%. An untreated extract and an extract purified with ion exchangers were used separately as carbon sources in this example.

A culture medium containing 10 g/dl d.s.b. date extract, 0.3 g/dl phosphate, 0.2 g/dl peptone, 0.2 g/dl sodium chloride, 0.04 g/dl magnesium sulfate, and 0.001 g/dl ferrous ammonium sulfate was sterilized, adjusted to pH 6.5 and then 2% by volume of a starter culture obtained after culturing for 41 hours was added to the main propagation medium. The mixture was cultured for 144 hours with agitation. The accumulated pullulan was recovered, purified and its molecular weight was determined following the procedures described in Example 1. The results are listed in Table 6.

Table 6

| | Final pH | | | | Turbidity | | | | Residual sugar, % | | | | Yield, % | | | |
| --- | --- | --- | --- | --- | --- | --- | --- | --- | --- | --- | --- | --- | --- | --- | --- | --- |
| Date extract Hrs. | 48 | 96 | 120 | 144 | 48 | 96 | 120 | 144 | 48 | 96 | 120 | 144 | 48 | 96 | 120 | 144 |
| Decolorized | 4.6 | 4.6 | 5.1 | | 0.95 | 1.25 | 1.22 | | 4.7 | 4 | 5 | | 22.9 | 68 | 67 | |
| Decolorized | 4.7 | 5.0 | 5.6 | | 0.96 | 1.23 | 1.25 | | 4.3 | 2 | 3 | | 30.6 | 73 | 76 | |
| Ion-exchanger-purified | 3.8 | 3.8 | 3.8 | 3.9 | 0.7 | 0.9 | 1.0 | 1.0 | 5.5 | 2.4 | 1.0 | 2 | 19 | 45 | 51 | 58 |
| Ion-exchanger-purified | 3.8 | 3.7 | 3.7 | 3.7 | 0.6 | 0.8 | 0.9 | 1.0 | 6.2 | 3.1 | 2.1 | 1.1 | 23 | 46 | 59 | 60 |

As Table 6 shows, the date extract gives satisfactory results. The purified extract and the extract which was not purified by ion exchange showed distinct differences in the progress of the culture and also in the yield of pullulan. More particularly, the extract which was not purified reduced the culture period and gave an improved yield.

What is claimed is:

1. A process of producing pullulan which comprises:
   a. culturing a pullulan producing microorganism on an aqueous culture medium containing assimilable sources of carbon and nitrogen and minor nutrients necessary to the growth of said microorganism until pullulan accumulates in said medium,
   1. the initial pH value of said medium being between 5 and 7.5,
   2. said medium having an initial content of phosphate ions corresponding to 0.1 g to 0.4 g $K_2HPO_4$ per deciliter,
   3. said content of phosphate ions being low enough to make the mean molecular weight of pullulan higher than the mean molecular weight of pullulan produced in said medium by said microorganism at a phosphate ion concentration corresponding to 0.5 g $K_2HPO_4$ per deciliter; and
   b. recovering said accumulated pullulan from said medium.

2. A process as set forth in claim 1 wherein said microorganism is Pullularia fermentans var fermentans IFO 6401, *Pullularia fermentans var fusca* IFO 6402, *Pullularia pullulans* AHU 9553, *Pullularia pullulans* IFO 6353, *Dematium pullulans* IFO 4464 or *Pullularia pullulans*-2 (Kp-13).

3. A process as set forth in claim 1 wherein said assimilable carbon source essentially consists of date extract.

4. A process as set forth in claim 1 wherein said pH value is between 6 and 7.

5. A process as set forth in claim 1 wherein said microorganism is cultured on said medium until 20 to 75% of said carbon source is converted to said pullulan.

6. A process as set forth in claim 1 wherein said microorganism is cultured on said medium for 3 to 8 days.

* * * * *

UNITED STATES PATENT AND TRADEMARK OFFICE
CERTIFICATE OF CORRECTION

PATENT NO. : 3,912,591
DATED : October 14, 1975
INVENTOR(S) : KOSO KATO ET AL

It is certified that error appears in the above-identified patent and that said Letters Patent are hereby corrected as shown below:

Column 7, line 21 (line 13 of claim 1), before "pullulan"

insert -- the accumulated --.

Signed and Sealed this thirtieth Day of December 1975

[SEAL]

Attest:

RUTH C. MASON
*Attesting Officer*

C. MARSHALL DANN
*Commissioner of Patents and Trademarks*